US012684620B2

(12) United States Patent
Wang et al.

(10) Patent No.: US 12,684,620 B2
(45) Date of Patent: Jul. 14, 2026

(54) REPEAT TRANSMISSION PROCESSING METHOD AND APPARATUS, TERMINAL, AND NETWORK SIDE DEVICE

(71) Applicant: VIVO MOBILE COMMUNICATION CO., LTD., Dongguan (CN)

(72) Inventors: Zhen Wang, Dongguan (CN); Yong Wang, Dongguan (CN); Wei Sun, Dongguan (CN); Zijian He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 369 days.

(21) Appl. No.: 18/374,836

(22) Filed: Sep. 29, 2023

(65) Prior Publication Data

US 2024/0032100 A1     Jan. 25, 2024

Related U.S. Application Data

(63) Continuation of application No. PCT/CN2022/084511, filed on Mar. 31, 2022.

(30) Foreign Application Priority Data

Apr. 1, 2021   (CN) .......................... 202110358454.6

(51) Int. Cl.
*H04W 74/08*        (2024.01)
*H04W 56/00*        (2009.01)
*H04W 74/0816*      (2024.01)

(52) U.S. Cl.
CPC ... *H04W 74/0816* (2013.01); *H04W 56/0045* (2013.01)

(58) Field of Classification Search
CPC ........... H04B 7/0695; H04W 56/0045; H04W 74/0816; H04W 74/0833; H04W 76/30; H04L 1/1864; H04L 1/189; H04L 1/1887; Y02D 30/70
See application file for complete search history.

(56) References Cited

U.S. PATENT DOCUMENTS

2017/0202008 A1* 7/2017 Nader .................. H04L 1/1887
2019/0158246 A1   5/2019 Zeng et al.
2019/0363843 A1  11/2019 Gordaychik
(Continued)

FOREIGN PATENT DOCUMENTS

CN        109076546 A  * 12/2018  .............. H04W 4/70
CN        110169093 A     8/2019
(Continued)

OTHER PUBLICATIONS

Intel Corporation, "On synchronization for NB-IoT and eMTC NTN", 3GPP TSG RAN WG1 104-e, e-Meeting, Jan. 25-Feb. 5, 2021, R1-2100683.

(Continued)

*Primary Examiner* — Phong La
(74) *Attorney, Agent, or Firm* — The Webb Law Firm

(57)     ABSTRACT

A repeat transmission processing method includes obtaining, by a terminal, first information; determining, by the terminal, at least one transmission gap in a first repeat transmission process according to the first information; and performing, by the terminal, a first operation in a transmission gap.

20 Claims, 4 Drawing Sheets

(56) References Cited

U.S. PATENT DOCUMENTS

| | | | | |
|---|---|---|---|---|
| 2020/0014523 A1 * | 1/2020 | Huang | .................... | H04L 5/001 |
| 2020/0314842 A1 * | 10/2020 | Bhattad | ................ | H04L 1/1893 |
| 2020/0359336 A1 * | 11/2020 | Dinan | ................... | H04W 72/20 |
| 2021/0037484 A1 | 2/2021 | Zhou et al. | | |
| 2021/0328659 A1 | 10/2021 | Luo et al. | | |
| 2022/0022152 A1 | 1/2022 | Liu et al. | | |
| 2022/0182206 A1 | 6/2022 | Zhao | | |
| 2022/0330184 A1 | 10/2022 | Lei | | |
| 2024/0032100 A1 * | 1/2024 | Wang | ................... | H04B 7/0695 |

FOREIGN PATENT DOCUMENTS

| | | | | | |
|---|---|---|---|---|---|
| CN | 110418402 A | | 11/2019 | | |
| CN | 111064539 A | | 4/2020 | | |
| CN | 111385013 A | | 7/2020 | | |
| CN | 111831604 A | * | 10/2020 | ......... | G06F 13/4282 |
| CN | 111885695 A | | 11/2020 | | |
| KR | 20190132470 A | * | 11/2019 | ......... | H04W 74/006 |
| WO | 2020092561 A1 | | 5/2020 | | |
| WO | 2020163610 A1 | | 8/2020 | | |
| WO | 2020200068 A1 | | 10/2020 | | |
| WO | WO-2021003628 A1 | * | 1/2021 | ........... | H04W 72/04 |
| WO | 2021034779 A1 | | 2/2021 | | |

OTHER PUBLICATIONS

Spreadtrum Communications, "Consideration on enhancements to time and frequency synchronization", 3GPP TSG RAN WG1 Meeting #104-e, E-Meeting, Jan. 25-Feb. 5, 2021, R1-2100810.

ZTE, "Discussion on enhancements for IoT-NTN", 3GPP TSG RAN WG1 #103-e, e-Meeting, Oct. 26-Nov. 13, 2020, R1-2008855.

* cited by examiner

REPEAT TRANSMISSION PROCESSING METHOD AND APPARATUS, TERMINAL, AND NETWORK SIDE DEVICE

CROSS-REFERENCE TO RELATED APPLICATIONS

This application is a Bypass Continuation Application of International Application No. PCT/CN2022/084511, filed Mar. 31, 2022, and claims priority to Chinese Patent Application No. 202110358454.6, filed Apr. 1, 2021, the disclosures of which are hereby incorporated by reference in their entireties.

BACKGROUND OF THE INVENTION

Field of the Invention

This application pertains to the field of communication technologies, and specifically relates to a repeat transmission processing method and apparatus, a terminal, and a network side device.

Description of Related Art

Built on a cellular network, a narrow band Internet of Things (NB-IoT) consumes only about 180 KHz of bandwidth and uses a license band, and may coexist with an existing network in three deployment manners: an in-band, a guard band, and an independent carrier. The NB-IoT may be directly deployed in a Global System for Mobile Communication (GSM) network, a Universal Mobile Telecommunication System (UMTS) network, or a Long Term Evolution (LTE) network to reduce deployment costs and implement smooth upgrade. The NB-IoT features ultra-strong coverage, ultra-low power consumption, and ultra-large connection.

SUMMARY OF THE INVENTION

Embodiments of this application provide a repeat transmission processing method and apparatus, a terminal, and a network side device.

According to a first aspect, a repeat transmission processing method is provided, including:

obtaining, by a terminal, first information;

determining, by the terminal, at least one transmission gap in a first repeat transmission process according to the first information; and performing, by the terminal, a first operation in the transmission gap.

According to a second aspect, a repeat transmission processing method is provided, including:

sending, by a network side device, first information, where the first information is used to indicate at least one transmission gap in a first repeat transmission process; and performing, by the network side device, a second operation corresponding to a first operation in the transmission gap.

According to a third aspect, a repeat transmission processing apparatus is provided, applied to a terminal and including:

a first obtaining module, configured to obtain first information;

a first determining module, configured to determine at least one transmission gap in a first repeat transmission process according to the first information; and a first operation module, configured to perform a first operation in the transmission gap.

According to a fourth aspect, a repeat transmission processing apparatus is provided, applied to a network side device and including:

a first sending module, configured to send first information, where the first information is used to indicate at least one transmission gap in a first repeat transmission process; and a second operation module, configured to perform a second operation corresponding to a first operation in the transmission gap.

According to a fifth aspect, a terminal is provided. The terminal includes a processor, a memory, and a program or an instruction that is stored in the memory and executable on the processor, where the program or the instruction is executed by the processor to implement the steps of the method in the first aspect.

According to a sixth aspect, a terminal is provided, including a processor and a communication interface, where the communication interface is configured to obtain first information; and the processor is configured to: determine at least one transmission gap in a first repeat transmission process according to the first information, and perform a first operation in the transmission gap.

According to a seventh aspect, a network side device is provided. The network side device includes a processor, a memory, and a program or an instruction that is stored in the memory and executable on the processor, where the program or the instruction is executed by the processor to implement the steps of the method in the second aspect.

According to an eighth aspect, a network side device is provided, including a processor and a communication interface, where the communication interface is configured to send first information, where the first information is used to indicate at least one transmission gap in a first repeat transmission process; and the processor is configured to perform a second operation corresponding to a first operation in the transmission gap.

According to a ninth aspect, a non-transitory readable storage medium is provided. The non-transitory readable storage medium stores a program or an instruction, and when the program or the instruction is executed by a processor, the steps of the method in the first aspect or the steps of the method in the second aspect are implemented.

According to a tenth aspect, a chip is provided. The chip includes a processor and a communication interface, the communication interface is coupled to the processor, and the processor is configured to run a program or an instruction to implement the method in the first aspect or the method in the second aspect.

According to an eleventh aspect, a computer program/program product is provided, where the computer program/program product is stored in a non-volatile storage medium, and the program/program product is executed by at least one processor to implement the steps of the method in the first aspect, or the steps of the method in the second aspect.

According to a twelfth aspect, a communication device is provided, configured to perform the steps of the method in the first aspect, or the steps of the method in the second aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. The following descriptions describe a new radio (NR) system for example purposes, and NR terms are used in most of the following descriptions, but these technologies can also be applied to an application other than an NR system application, for example, a 6-th generation (6G) communication system.

Figures 1, 2:
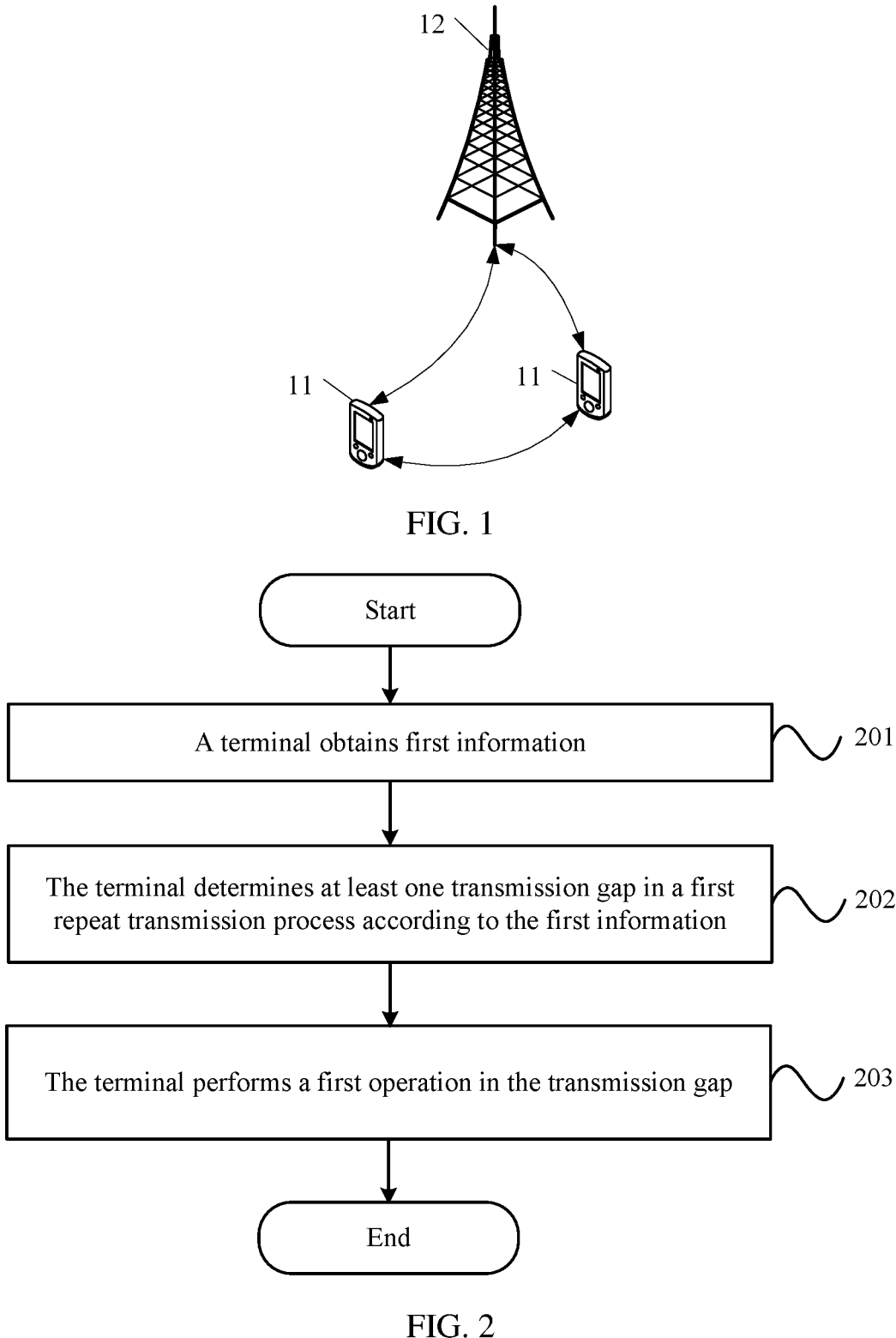
FIG. 1 is a block diagram of a wireless communication system to which the embodiments of this application can be applied.
FIG. 2 is a first flowchart of steps of a repeat transmission processing method according to an embodiment of this application.

FIG. 1 is a block diagram of a wireless communication system to which embodiments of this application can be applied. The wireless communication system includes a terminal 11 and a network side device 12. The terminal 11 may also be referred to as a terminal device or user equipment (UE). The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a smartwatch, a bracelet, a headset, glasses, and the like. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (Wi-Fi) node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

A non-terrestrial network is a network or network segment in which transmission is performed by using a satellite or an unmanned aircraft system (UAS) platform. Applicable typical scenes include cases that a ground base station cannot be constructed and a ground base station is damaged, for example, continuous coverage in remote mountains, deserts, oceans, and forests, or emergency communication when a natural disaster occurs or a ground base station is damaged. The satellites include a low earth orbiting (LEO) satellite, a medium earth orbiting (MEO) satellite, a geostationary earth orbiting (GEO) satellite, a highly elliptical orbiting (HEO) satellite, and the like.

An Internet of Things over non terrestrial networks (IoT over NTN) uses a satellite as a forwarding relay, that is, a link from a base station to an Internet of Things (IoT) terminal is divided into two links: a link from the base station to a satellite (a feedback link) and a link from the satellite to the IoT terminal (a service link).

To better support uplink coverage enhancement, a repeat transmission mechanism is introduced on an uplink physical channel in the NB-IoT system. Similarly, a repeat transmission mechanism is also used in a downlink. In the prior art, one uplink gap (UL gap) used for synchronization is forcibly added to a narrowband physical uplink shared channel (NPUSCH) after each time repeat transmission is continuously performed for 256 ms. The uplink gap is fixedly configured as fixed duration 40 ms, a frequency domain resource is configured separately, and a resource for repeat transmission of the NPUSCH is not occupied.

In the existing IoT, time-frequency synchronization can be performed again by using an uplink gap only after each time repeat transmission is continuously performed for 256 ms. However, in the IoT over NTN, because a satellite is in a high-speed motion, after a period of time, a relatively large time offset and frequency offset are accumulated during repeat transmission, and an out-of-synchronization is caused quickly. In addition, operating speeds of different satellites are different, and out-of-synchronization speeds are different. The faster operating speed of the satellite is, the faster the out-of-synchronization is. Even during repeat transmission, a cell reselection process may be initiated. However, time-frequency synchronization cannot be performed in a timely manner by using the existing uplink gap.

With reference to the accompanying drawings, the following describes in detail a repeat transmission processing method and apparatus, a terminal, and a network side device provided in the embodiments of this application by using some embodiments and application scenes.

As shown in FIG. 2, an embodiment of this application provides a repeat transmission processing method, including:

Step 201: A terminal obtains first information.

Step 202: The terminal determines at least one transmission gap in a first repeat transmission process according to the first information.

Step 203: The terminal performs a first operation in the transmission gap.

The first repeat transmission process in this embodiment of this application may be an uplink repeat transmission process, or may be a downlink repeat transmission process. This is not specifically limited herein. Correspondingly, a transmission gap in the uplink repeat transmission process may be referred to as an uplink transmission gap (UL gap), and a transmission gap in the downlink repeat transmission process may be referred to as a downlink transmission gap (DL gap).

Optionally, the transmission gap in this embodiment of this application is a part of the first repeat transmission process. A frequency domain resource of the transmission gap is the same as a frequency domain resource of repeat transmission in the first repeat transmission process, and a time domain resource length of the transmission gap is a part of a time domain resource length of repeat transmission in the first repeat transmission process, and is configured by using the first information.

In at least one embodiment of this application, step 201 includes:

obtaining, by the terminal, the first information in a first manner, where the first manner includes at least one of the following:

a network preconfiguration;

a radio resource control (RRC) configuration;

a downlink control information (DCI) configuration; or a Medium Access Control (MAC) control element (CE) configuration.

Optionally, when the network side device configures the first information by using DCI, the DCI may be carried on physical downlink control channel (PDCCH) signaling (order). The PDCCH order is used to trigger the terminal to initiate random access or monitor some system information, or is used to instruct the terminal whether to perform beam switching.

In at least one embodiment of this application, the first information includes at least one of the following:

enabling information of the transmission gap, used to indicate whether to enable the transmission gap in the first repeat transmission process;

time domain offset information of the transmission gap in the first repeat transmission process;

period information of the transmission gap in the first repeat transmission process; a time domain resource length of the transmission gap in the first repeat transmission process;

a quantity of the transmission gap in the first repeat transmission process;

a transmission type of the first operation in the transmission gap; or time domain resource information of the first operation in the transmission gap.

In an optional embodiment, the transmission type of the first operation in the transmission gap includes at least one of the following:

downlink synchronization (for example, timing synchronization and frequency offset compensation);

monitoring a PDCCH, which may be monitoring a PDCCH order, where the PDCCH order is used to trigger the terminal to initiate random access or monitor some system information, or is used to instruct the terminal whether to perform beam switching; uplink synchronization (for example, timing synchronization and frequency offset compensation);

random access, where the random access may be random access triggered by a PDCCH order, or may be random access actively initiated by the terminal (which may be predefined behavior);

cell reselection;

cell switching;

beam switching;

a feedback of completed repeat transmission, for example, an acknowledgement (ACK) feedback or a negative acknowledgement (NACK) feedback; or timing advance (TA) compensation.

It should be noted that first operations performed by the terminal in different transmission gaps may be the same or different; or functions of first operations in different transmission gaps may be the same or different; or transmission types of first operations in different transmission gaps may be the same or different.

Alternatively, the terminal may perform a first operation of one transmission type in one transmission gap, or first operations of a plurality of transmission types. For example, the terminal performs only cell switching in one transmission gap; or the terminal first performs cell switching and then performs a synchronization operation in one transmission gap, which are not enumerated herein.

For the transmission type of the first operation in the transmission gap, in at least one embodiment of this application, in a case that the transmission type of the first operation includes downlink synchronization, the time domain resource length of the transmission gap is greater than or equal to a time length required for switching between uplink and downlink, or the time domain resource length of the transmission gap includes at least a time length required for switching between uplink and downlink.

In an optional embodiment, in a case that the transmission type of the first operation includes TA compensation, step 203 includes:

calculating, by the terminal, a TA value of a service link according to a positioning capability and an ephemeris;

calculating, by the terminal, a TA value of a feedback link by using a TA change rate, or determining, by the terminal, a TA value of a feedback link according to a network indication; and performing, by the terminal, TA compensation according to the TA value of the service link and the TA value of the feedback link, where a compensated TA value takes effect when the transmission gap ends.

It should be noted that a manner in which a network indicates the TA value of the feedback link includes:

(1) The network directly indicates the TA value of the feedback link.

(2) One TA set (both the network and the terminal know the TA set) is predefined in advance according to information such as a cell size and a satellite motion track. After determining the TA value of the feedback link, the network indicates a TA index in the TA set to the terminal. The terminal determines the TA value of the feedback link according to the TA index and the TA set.

In another optional embodiment, in a case that the transmission type of the first operation includes uplink synchronization or downlink synchronization, step 203 includes:

calculating, by the terminal, a frequency offset value of a service link according to a positioning capability and ephemeris information; and performing, by the terminal, pre-compensation on a frequency offset from a terminal to a satellite and a frequency offset from the satellite to a base station according to the frequency offset value of the service link and a frequency offset value of a feedback link indicated by a network; or performing, by the terminal, pre-compensation on a frequency offset from a terminal to a satellite according to the frequency offset value of the service link.

In other words, the network may feed back the frequency offset value of the feedback link to the terminal, or may not feed back the frequency offset value of the feedback link to the terminal. If the network does not feed back the frequency offset value of the feedback link to the terminal, the terminal performs pre-compensation on the frequency offset from the terminal to the satellite according to only the frequency offset value of the service link, and the network side device needs to perform post-compensation on the frequency offset from the satellite to the base station according to the frequency offset value of the feedback link.

In still another optional embodiment, in a case that the transmission type of the first operation includes beam switching, step 203 includes:

in response to RRC connection release signaling triggered by a network, entering, by the terminal, an RRC idle state from an RRC connected state, and suspending the first repeat transmission process;

selecting, by the terminal, an optimal beam (for a multi-beam cell), executing a random access process, and reporting the optimal beam to the network in the random access process; and determining, by the terminal, according to an indication of the network, a beam to which the terminal is to be switched, and switching to the beam indicated by the network.

In this embodiment of this application, for a single-beam cell, beam switching is equivalent to cell reselection, which is not described in this application.

In still another optional embodiment, in a case that the transmission type of the first operation includes a feedback of completed repeat transmission, step 203 includes:

switching, by the terminal, to a downlink to receive reception feedback information that is of repeat transmission and that is sent by a network; and if the reception feedback information is an acknowledgement feedback, stopping, by the terminal, the first repeat transmission process after the first operation ends, where the network releases resources of the first repeat transmission process when feeding back the acknowledgement feedback; or if the reception feedback information is a negative acknowledgement feedback, continuing, by the terminal, the first repeat transmission process after the first operation ends.

In another optional embodiment, in a case that the transmission type of the first operation includes at least one of random access, cell reselection, cell switching, or beam switching, if the terminal has completed random access, stopping, by the terminal, the first repeat transmission process after the first operation ends; or if the terminal has completed cell reselection, stopping, by the terminal, the first repeat transmission process after the first operation ends.

In this embodiment of this application, if the terminal has completed random access or cell reselection in the transmission gap, and the first repeat transmission process is for a source cell or a source beam, the terminal stops performing the first repeat transmission process after completing random access or cell reselection in the transmission gap.

In view of above, in this embodiment of this application, first information is introduced in a repeat transmission process, and a transmission gap in the repeat transmission process is flexibly configured by using the first information. Therefore, a terminal can flexibly determine the transmission gap according to the first information, and perform a first operation by using the determined transmission gap, to improve reliability of subsequent repeat transmission.

Figures 3, 4, 5:
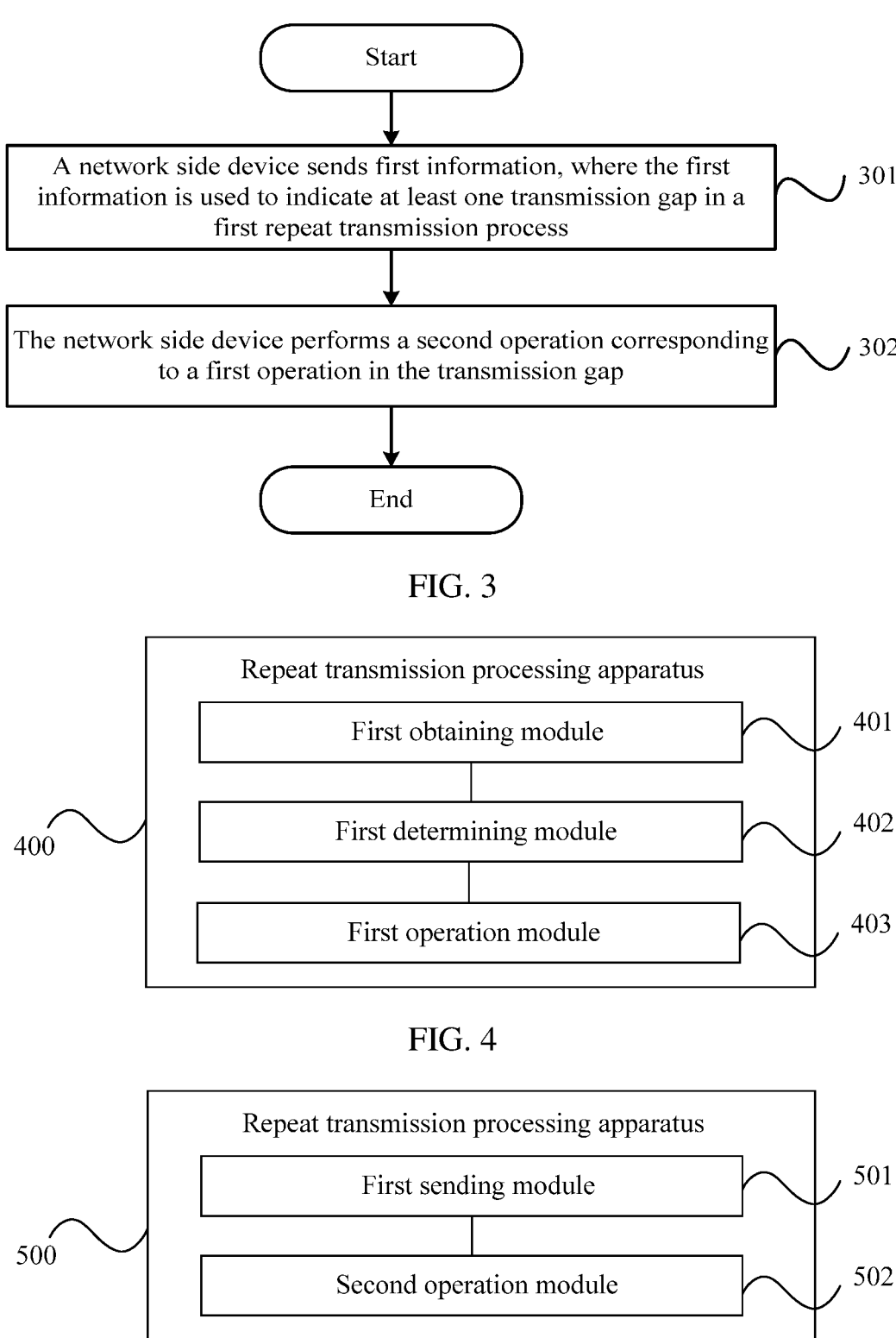
FIG. 3 is a second flowchart of steps of a repeat transmission processing method according to an embodiment of this application.
FIG. 4 is a first schematic structural diagram of a repeat transmission processing apparatus according to an embodiment of this application.
FIG. 5 is a second schematic structural diagram of a repeat transmission processing apparatus according to an embodiment of this application.

As shown in FIG. 3, an embodiment of this application further provides a repeat transmission processing method, including:

Step 301: A network side device sends first information, where the first information is used to indicate at least one transmission gap in a first repeat transmission process.

Step 302: The network side device performs a second operation corresponding to a first operation in the transmission gap.

The first repeat transmission process in this embodiment of this application may be an uplink repeat transmission process, or may be a downlink repeat transmission process. This is not specifically limited herein. Correspondingly, a transmission gap in the uplink repeat transmission process may be referred to as an uplink transmission gap (UL gap), and a transmission gap in the downlink repeat transmission process may be referred to as a downlink transmission gap (DL gap).

In at least one embodiment of this application, step 301 includes:

sending, by the network side device, the first information in a first manner, where the first manner includes at least one of the following:

a network preconfiguration;

a RRC configuration;

a DCI configuration; or a MAC CE configuration.

Optionally, when the network side device configures the first information by using DCI, the DCI may be carried on a PDCCH order. The PDCCH order is used to trigger a terminal to initiate random access or monitor some system information, or is used to instruct a terminal whether to perform beam switching.

In at least one embodiment of this application, the first information includes at least one of the following:

enabling information of the transmission gap;

time domain offset information of the transmission gap in the first repeat transmission process;

period information of the transmission gap in the first repeat transmission process; a time domain resource length of the transmission gap in the first repeat transmission process;

a quantity of the transmission gap in the first repeat transmission process;

a transmission type of the first operation in the transmission gap; or time domain resource information of the first operation in the transmission gap.

In an optional embodiment, the method further includes:

determining, by the network side device, the first information according to transmission duration and/or a satellite orbital height in the first repeat transmission process.

For example, the network side device configures a start time, duration, and a period of the transmission gap according to different orbiting satellites or operating speeds of different satellites, and then performs operations such as timing offset and frequency offset compensation in a timely manner by using the transmission gap, thereby ensuring time-frequency synchronization of subsequent repeat transmission, and improving validity of subsequent repeat transmission.

In another optional embodiment, the transmission type of the first operation in the transmission gap includes at least one of the following:

downlink synchronization (for example, timing synchronization and frequency offset compensation);

monitoring a PDCCH, which may be monitoring a PDCCH order, where the PDCCH order is used to trigger the terminal to initiate random access or monitor some system information, or is used to instruct the terminal whether to perform beam switching;

uplink synchronization (for example, timing synchronization and frequency offset compensation);

random access, where the random access may be random access triggered by a PDCCH order, or may be random access actively initiated by the terminal (which may be predefined behavior);

cell reselection;

cell switching;

beam switching;

a feedback of completed repeat transmission, for example an acknowledgement ACK feedback or a negative acknowledgement NACK feedback; or TA compensation.

It should be noted that first operations performed by the terminal in different transmission gaps may be the same or different; or functions of first operations in different transmission gaps may be the same or different; or transmission types of first operations in different transmission gaps may be the same or different.

Alternatively, the terminal may perform a first operation of one transmission type in one transmission gap, or first operations of a plurality of transmission types. For example, the terminal performs only cell switching in one transmission gap; or the terminal first performs cell switching and then performs a synchronization operation in one transmission gap, which are not enumerated herein.

For the transmission type of the first operation in the transmission gap, in at least one embodiment of this application, in a case that the transmission type of the first operation includes downlink synchronization, the time domain resource length of the transmission gap is greater than or equal to a time length required for switching between uplink and downlink, or the time domain resource length of the transmission gap includes at least a time length required for switching between uplink and downlink.

In an optional embodiment, in a case that the transmission type of the first operation includes TA compensation, step 302 includes:

calculating, by the network side device, a TA value of a feedback link by using a TA change rate or ephemeris information, and feeding back the TA value of the feedback link to a terminal, so that the terminal performs TA compensation according to a TA value of a service link and the TA value of the feedback link, where a compensated TA value takes effect when the transmission gap ends.

It should be noted that a manner in which a network indicates the TA value of the feedback link includes:

(1) The network directly indicates the TA value of the feedback link.

(2) One TA set (both the network and the terminal know the TA set) is predefined in advance according to information such as a cell size and a satellite motion track. After determining the TA value of the feedback link, the network indicates a TA index in the TA set to the terminal. The terminal determines the TA value of the feedback link according to the TA index and the TA set.

In another optional embodiment, in a case that the transmission type of the first operation includes uplink synchronization or downlink synchronization, step 302 includes:

calculating, by the network side device, a frequency offset value of a feedback link, and feeding back the frequency offset value of the feedback link to a terminal, so that the terminal performs pre-compensation on a frequency offset from the terminal to a satellite and a frequency offset from the satellite to a base station according to a frequency offset value of a service link and the frequency offset value of the feedback link; or calculating, by the network side device, a frequency offset value of a feedback link, and performing post-compensation on a frequency offset from a satellite to a base station according to the frequency offset value of the feedback link.

In other words, the network may feed back the frequency offset value of the feedback link to the terminal, or may not feed back the frequency offset value of the feedback link to the terminal. If the network does not feed back the frequency offset value of the feedback link to the terminal, the terminal performs pre-compensation on the frequency offset from the terminal to the satellite according to only the frequency offset value of the service link, and the network side device needs to perform post-compensation on the frequency offset from the satellite to the base station according to the frequency offset value of the feedback link.

In still another optional embodiment, in a case that the transmission type of the first operation includes beam switching, step 302 includes:

sending, by the network side device, RRC connection release signaling to a terminal, to instruct the terminal to enter an RRC idle state from an RRC connected state and suspend the first repeat transmission process;

receiving, by the network side device, an optimal beam (for a multi-beam cell) reported by the terminal in a random access process; and indicating, by the network side device to the terminal according to the optimal beam, a beam to which the terminal is to be switched.

In this embodiment of this application, for a single-beam cell, beam switching is equivalent to cell reselection, which is not described in this application.

In still another optional embodiment, in a case that the transmission type of the first operation includes a feedback of completed repeat transmission, step 302 includes:

sending, by the network side device, reception feedback information of repeat transmission to a terminal; and if the reception feedback information is an acknowledgement feedback, stopping, by the network side device, the first repeat transmission process after the first operation ends, where the network releases resources of the first repeat transmission process when feed backing the acknowledgement feedback; or if the reception feedback information is a negative acknowledgement feedback, continuing, by the network side device, the first repeat transmission process after the first operation ends.

In another optional embodiment, in a case that the transmission type of the first operation includes at least one of random access, cell reselection, cell switching, or beam switching, if a terminal has completed random access, stopping, by the network side device, the first repeat transmission process after the first operation ends; or if a terminal has completed cell reselection, stopping, by the network side device, the first repeat transmission process after the first operation ends.

In this embodiment of this application, if the terminal has completed random access or cell reselection in the transmission gap, and the first repeat transmission process is for a source cell or a source beam, the terminal stops performing the first repeat transmission process after completing random access or cell reselection in the transmission gap.

In view of above, in this embodiment of this application, first information is introduced in a repeat transmission process, and a transmission gap in the repeat transmission process is flexibly configured by using the first information. Therefore, a terminal can flexibly determine the transmission gap according to the first information, and perform a first operation by using the determined transmission gap, to improve reliability of subsequent repeat transmission.

To describe the repeat transmission processing method provided in the embodiments of this application more clearly, the following provides several examples for illustration.

Example 1

In a case that the transmission type of the first operation is cell reselection, 1. The terminal obtains the first information by using RRC or DCI, and determines information such as a start time and duration of the transmission gap.
2. The terminal reports an RRC connection release request, and the base station triggers RRC connection release (which may be predefined behavior, and the terminal does not need to report the RRC connection release request). The terminal enters an RRC idle state from an RRC connected state, and the terminal suspends the repeat transmission.
3. The terminal performs a cell reselection process, and then the terminal initiates an RRC connection recovery procedure in an RRC idle state to enter an RRC connected state.
4. After cell reselection is completed, the network needs to re-schedule uplink repeat transmission for the terminal. Therefore, the terminal does not continue the previous repeat transmission after the first operation ends.

Example 2

In a case that the transmission type of the first operation is downlink synchronization, 1. The terminal obtains the first information by using RRC or DCI, and determines information such as a start time and duration of the transmission gap.
2. When entering the transmission gap, the terminal switches to a downlink, and the base station repeatedly sends a narrowband primary synchronization signal (NPSS)/narrowband secondary synchronization signal (NSSS)/narrowband reference signal (NRS), where a quantity of repetition times may be predefined or preconfigured.
3. The terminal continuously receives the NPSS/NSSS/NRS signal and performs synchronization tracing to complete time-frequency offset compensation.
4. After completing downlink synchronization, the terminal continues the previous repeat transmission after the first operation ends.

Example 3

In a case that the transmission type of the first operation is random access,

1. The base station delivers a PDCCH order to the terminal by using DCI, where the PDCCH order ends in a subframe n.
2. The terminal switches to a downlink, and obtains NPRACH frequency domain resource information, a quantity of repeat transmission times, and a preamble type from system information or DCI.
3. The terminal switches to an uplink again, and starts to send a preamble in a subframe of a first available NPRACH resource after the end of a subframe n+k, where k may be predefined or preconfigured or specified by the network side.
4. After completing random access, the terminal does not continue the previous repeat transmission after the first operation ends.

Example 4

In a case that the transmission type of the first operation is TA compensation, the following is a TA compensation manner:

1. The terminal calculates a TA value of a service link according to a positioning capability of the terminal and an ephemeris, and reports the TA of the service link to the network.
2. The terminal calculates a TA value of a feedback link according to a TA change rate.
3. The network also calculates the TA value of the feedback link according to the TA change rate.
4. Both the terminal and the network know the TA values of the service link and the feedback link, to facilitate TA adjustment.
5. An adjusted TA takes effect when the transmission gap ends.
6. The terminal continues the previous repeat transmission after the first operation ends.

Example 5

In a case that the transmission type of the first operation is uplink synchronization, the following is one manner:

1. The terminal calculates a frequency offset value of a service link by using a positioning capability of the terminal and ephemeris information.

2. The terminal performs pre-compensation on only a frequency offset from the terminal to a satellite.

3. The network does not indicate a frequency offset value of a feedback link to the terminal.

4. The network performs post-compensation on a frequency offset from the satellite to a base station.

5. After completing uplink synchronization, the terminal continues the previous repeat transmission after the first operation ends.

It should be noted that, the repeat transmission processing method provided in the embodiments of this application may be performed by a repeat transmission processing apparatus, or a control module that is in the repeat transmission processing apparatus and that is configured to perform the repeat transmission processing method. In the embodiments of this application, an example in which the repeat transmission processing apparatus performs the repeat transmission processing method is used to describe the repeat transmission processing apparatus provided in the embodiments of this application.

As shown in FIG. 4, an embodiment of this application further provides a repeat transmission processing apparatus 400, applied to a terminal and including:

a first obtaining module 401, configured to obtain first information;

a first determining module 402, configured to determine at least one transmission gap in a first repeat transmission process according to the first information; and a first operation module 403, configured to perform a first operation in the transmission gap.

In an optional embodiment, the first obtaining module includes:

a first obtaining submodule, configured to obtain the first information in a first manner, where the first manner includes at least one of the following:

a network preconfiguration;

a RRC configuration;

a DCI configuration; or a MAC CE configuration.

In an optional embodiment, the first information includes at least one of the following:

enabling information of the transmission gap;

time domain offset information of the transmission gap in the first repeat transmission process;

period information of the transmission gap in the first repeat transmission process; a time domain resource length of the transmission gap in the first repeat transmission process;

a quantity of the transmission gap in the first repeat transmission process;

a transmission type of the first operation in the transmission gap; or time domain resource information of the first operation in the transmission gap.

In an optional embodiment, the transmission type of the first operation in the transmission gap includes at least one of the following:

downlink synchronization;

monitoring a PDCCH;

uplink synchronization;

random access;

cell reselection;

cell switching;

beam switching;

a feedback of completed repeat transmission; or

TA compensation.

In an optional embodiment, in a case that the transmission type of the first operation includes downlink synchronization, the time domain resource length of the transmission gap is greater than or equal to a time length required for switching between uplink and downlink.

In an optional embodiment, in a case that the transmission type of the first operation includes TA compensation, the first operation module includes:

a first submodule, configured to calculate a TA value of a service link according to a positioning capability and an ephemeris;

a second submodule, configured to calculate a TA value of a feedback link by using a TA change rate, or determining, by the terminal, a TA value of a feedback link according to a network indication; and a third submodule, configured to perform TA compensation according to the TA value of the service link and the TA value of the feedback link, where a compensated TA value takes effect when the transmission gap ends.

In an optional embodiment, in a case that the transmission type of the first operation includes uplink synchronization or downlink synchronization, the first operation module includes:

a fourth submodule, configured to calculate a frequency offset value of a service link according to a positioning capability and ephemeris information; and a fifth submodule, configured to perform pre-compensation on a frequency offset from a terminal to a satellite and a frequency offset from the satellite to a base station according to the frequency offset value of the service link and a frequency offset value of a feedback link indicated by a network; or perform pre-compensation on a frequency offset from a terminal to a satellite according to the frequency offset value of the service link.

In an optional embodiment, in a case that the transmission type of the first operation includes beam switching, the first operation module includes:

a sixth submodule, configured to: in response to RRC connection release signaling triggered by a network, enter an RRC idle state from an RRC connected state, and suspend the first repeat transmission process;

a seventh submodule, configured to: select an optimal beam, execute a random access process, and report the optimal beam to the network in the random access process; and an eighth submodule, configured to: determine according to an indication of the network, a beam to which the terminal is to be switched, and switch to the beam indicated by the network.

In an optional embodiment, in a case that the transmission type of the first operation includes a feedback of completed repeat transmission, the first operation module includes:

a ninth submodule, configured to switch to a downlink to receive reception feedback information that is of repeat transmission and that is sent by a network; and a tenth submodule, configured to: if the reception feedback information is an acknowledgement feedback, stop the first repeat transmission process after the first operation ends; or an eleventh module, configured to: if the reception feedback information is a negative acknowledgement feedback, continue the first repeat transmission process after the first operation ends.

In an optional embodiment, in a case that the transmission type of the first operation includes at least one of random access, cell reselection, cell switching, or beam switching, > if the terminal has completed random access, stopping, by the terminal, the first repeat transmission process after the first operation ends;
>
> or
>
> if the terminal has completed cell reselection, stopping, by the terminal, the first repeat transmission process after the first operation ends.

In this embodiment of this application, first information is introduced in a repeat transmission process, and a transmission gap in the repeat transmission process is flexibly configured by using the first information. Therefore, a terminal can flexibly determine the transmission gap according to the first information, and perform a first operation by using the determined transmission gap, to improve reliability of subsequent repeat transmission.

It should be noted that the repeat transmission processing apparatus provided in this embodiment of this application is an apparatus that can perform the foregoing repeat transmission processing method. Therefore, all embodiments of the foregoing repeat transmission processing method are applicable to the apparatus, and a same or similar beneficial effect can be achieved.

As shown in FIG. 5, an embodiment of this application further provides a repeat transmission processing apparatus 500, applied to a network side device and including:

> a first sending module 501, configured to send first information, where the first information is used to indicate at least one transmission gap in a first repeat transmission process; and
>
> a second operation module 502, configured to perform a second operation corresponding to a first operation in the transmission gap.

In an optional embodiment, the first sending module includes:

> a first sending submodule, configured to send the first information in a first manner, where the first manner includes at least one of the following:
>
> a network preconfiguration;
>
> a 1 RRC configuration;
>
> a DCI configuration; or
>
> a MAC CE configuration.

In an optional embodiment, the first information includes at least one of the following:

> enabling information of the transmission gap;
>
> time domain offset information of the transmission gap in the first repeat transmission process;
>
> period information of the transmission gap in the first repeat transmission process; a time domain resource length of the transmission gap in the first repeat transmission process;
>
> a quantity of the transmission gap in the first repeat transmission process;
>
> a transmission type of the first operation in the transmission gap; or
>
> time domain resource information of the first operation in the transmission gap.

In an optional embodiment, the apparatus further includes:

> an information determining module, configured to determine the first information according to transmission duration and/or a satellite orbital height in the first repeat transmission process.

In an optional embodiment, the transmission type of the first operation in the transmission gap includes at least one of the following:

> downlink synchronization;
>
> monitoring a PDCCH;
>
> uplink synchronization;
>
> random access;
>
> cell reselection;
>
> cell switching;
>
> beam switching;
>
> a feedback of completed repeat transmission; or
>
> TA compensation.

In an optional embodiment, in a case that the transmission type of the first operation includes downlink synchronization, the time domain resource length of the transmission gap is greater than or equal to a time length required for switching between uplink and downlink.

In an optional embodiment, in a case that the transmission type of the first operation includes TA compensation, the second operation module includes:

> a twelfth submodule, configured to: calculate a TA value of a feedback link by using a TA change rate or ephemeris information, and feed back the TA value of the feedback link to a terminal, so that the terminal performs TA compensation according to a TA value of a service link and the TA value of the feedback link, where a compensated TA value takes effect when the transmission gap ends.

In an optional embodiment, in a case that the transmission type of the first operation includes uplink synchronization or downlink synchronization, the second operation module includes:

> a thirteenth submodule, configured to: calculate a frequency offset value of a feedback link, and feed back the frequency offset value of the feedback link to a terminal, so that the terminal performs pre-compensation on a frequency offset from the terminal to a satellite and a frequency offset from the satellite to a base station according to a frequency offset value of a service link and the frequency offset value of the feedback link;
>
> or
>
> a fourteenth submodule, configured to: calculate a frequency offset value of a feedback link, and perform post-compensation on a frequency offset from a satellite to a base station according to the frequency offset value of the feedback link.

In an optional embodiment, in a case that the transmission type of the first operation includes beam switching, the second operation module includes:

> a fifteenth submodule, configured to: send RRC connection release signaling to a terminal, to instruct the terminal to enter an RRC idle state from an RRC connected state and suspend the first repeat transmission process;
>
> a sixteenth submodule, configured to receive an optimal beam reported by the terminal in a random access process; and
>
> a seventeenth submodule, configured to indicate, to the terminal according to the optimal beam, a beam to which the terminal is to be switched.

In an optional embodiment, in a case that the transmission type of the first operation includes a feedback of completed repeat transmission, the second operation module includes:

> an eighteenth submodule, configured to send reception feedback information of repeat transmission to a terminal; and a nineteenth submodule, configured to: if the reception feedback information is an acknowledgement feedback, stop the first repeat transmission process after the first operation ends; or a twentieth submodule, configured to: if the reception feedback information is a negative acknowledgement feedback, continue the first repeat transmission process after the first operation ends.

In an optional embodiment, in a case that the transmission type of the first operation includes at least one of random access, cell reselection, cell switching, or beam switching, if a terminal has completed random access, stopping, by the network side device, the first repeat transmission process after the first operation ends; or if a terminal has completed cell reselection, stopping, by the network side device, the first repeat transmission process after the first operation ends.

In this embodiment of this application, first information is introduced in a repeat transmission process, and a transmission gap in the repeat transmission process is flexibly configured by using the first information. Therefore, a terminal can flexibly determine the transmission gap according to the first information, and perform a first operation by using the determined transmission gap, to improve reliability of subsequent repeat transmission.

It should be noted that the repeat transmission processing apparatus provided in this embodiment of this application is an apparatus that can perform the foregoing repeat transmission processing method. Therefore, all embodiments of the foregoing repeat transmission processing method are applicable to the apparatus, and a same or similar beneficial effect can be achieved.

The repeat transmission processing apparatus in this embodiment of this application may be an apparatus, an apparatus or an electronic device with an operating system, or may be a component, an integrated circuit, or a chip in a terminal. The apparatus or the electronic device may be a mobile terminal, or a non-mobile terminal. For example, the mobile terminal may include but is not limited to the types of the foregoing listed terminal 11, and the non-mobile terminal may be a server, a network attached storage (NAS), a personal computer (PC), a television (TV), an automated teller machine, or a self-service machine. This is not specifically limited in the embodiments of this application.

The repeat transmission processing apparatus provided in this embodiment of this application can implement the processes implemented in the method embodiments in FIG. 1 to FIG. 3, and achieve a same technical effect. To avoid repetition, details are not described herein again.

Figure 6:
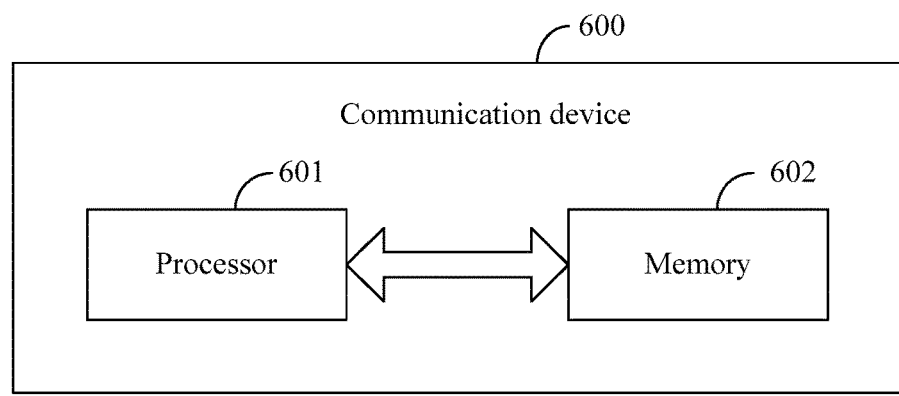
FIG. 6 is a schematic structural diagram of a communication device according to an embodiment of this application.

Optionally, as shown in FIG. 6, an embodiment of this application further provides a communication device 600, including a processor 601, a memory 602, and a program or an instruction that is stored in the memory 602 and executable on the processor 601. For example, when the communication device 600 is a terminal, the program or the instruction is executed by the processor 601 to implement the processes of the foregoing repeat transmission processing method embodiment, and a same technical effect can be achieved. When the communication device 600 is a network side device, the program or the instruction is executed by the processor 601 to implement the processes of the foregoing repeat transmission processing method embodiment, and a same technical effect can be achieved. To avoid repetition, details are not described herein again.

Figure 7:
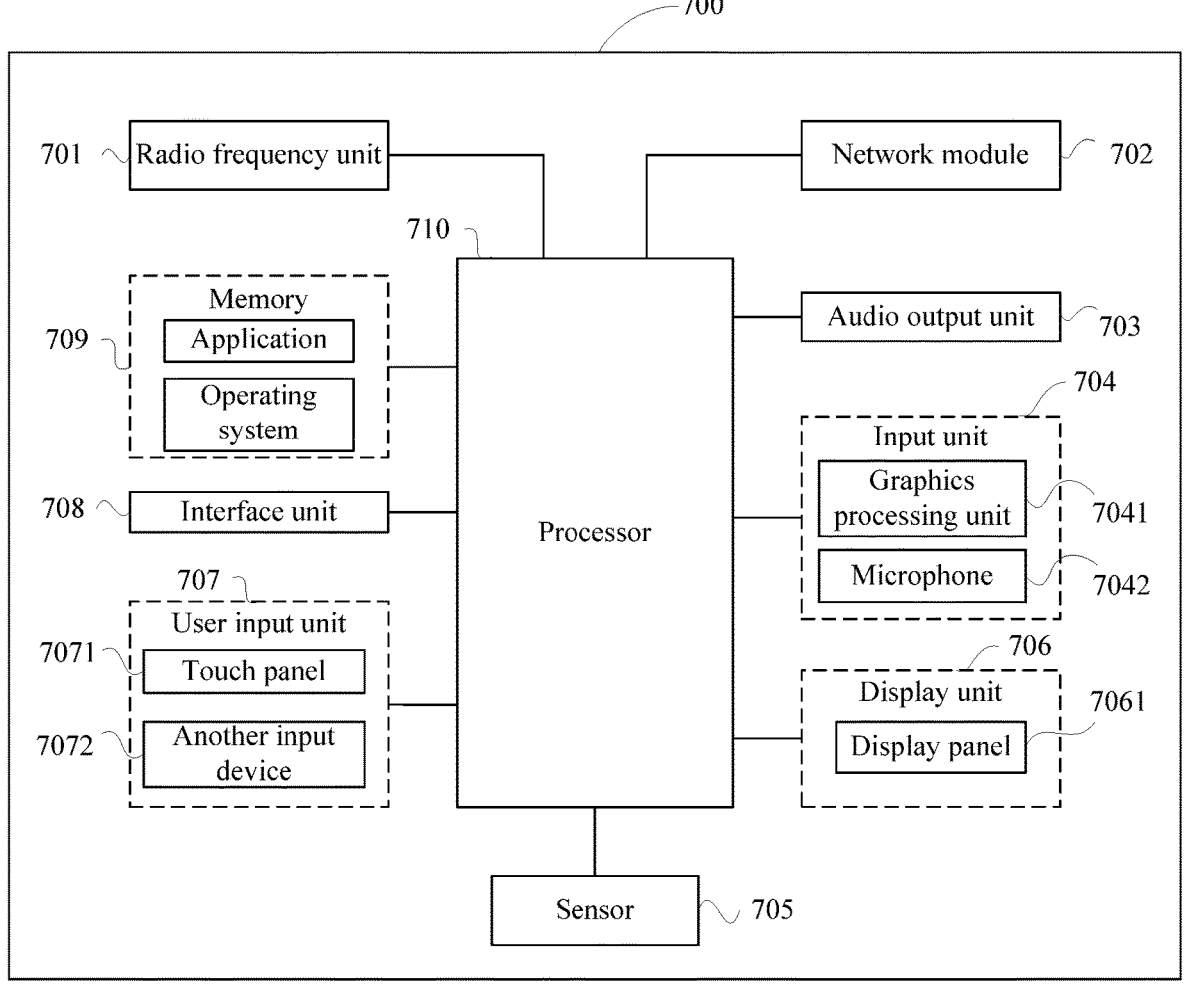
FIG. 7 is a schematic structural diagram of a terminal according to an embodiment of this application.

An embodiment of this application further provides a terminal, including a processor and a communication interface, where the communication interface is configured to obtain first information; and the processor is configured to: determine at least one transmission gap in a first repeat transmission process according to the first information, and perform a first operation in the transmission gap. This terminal embodiment corresponds to the foregoing method embodiment on the terminal side. Each implementation process and implementation of the foregoing method embodiment may be applicable to this terminal embodiment, and a same technical effect can be achieved. Optionally, FIG. 7 is a schematic structural diagram of hardware of a terminal according to an embodiment of this application.

A terminal 700 includes but is not limited to at least a part of components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) that supplies power to each component. The power supply may be logically connected to the processor 710 by using a power supply management system, to implement functions such as charging and discharging management, and power consumption management by using the power supply management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a graphics processing unit (GPU) 7041 and a microphone 7042, and the graphics processing unit 7041 processes image data of a still picture or a video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application or an instruction required by at least one function (for example, a sound playing function or an image playing function). In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 710 may include one or more processing units. Optionally, an application processor and a modem processor may be integrated into the processor 710. The application processor mainly processes an operating system, a user interface, an application, an instruction, or the like. The modem processor mainly processes wireless communication, for example, a baseband processor. It can be understood that, alternatively, the modem processor may not be integrated into the processor 710.

The radio frequency unit 701 is configured to obtain first information; and the processor 710 is configured to: determine at least one transmission gap in a first repeat transmission process according to the first information, and perform a first operation in the transmission gap.

In this embodiment of this application, first information is introduced in a repeat transmission process, and a transmission gap in the repeat transmission process is flexibly configured by using the first information. Therefore, a terminal can flexibly determine the transmission gap according to the first information, and perform a first operation by using the determined transmission gap, to improve reliability of subsequent repeat transmission.

It should be noted that the terminal provided in this embodiment of this application is a terminal that can perform the foregoing repeat transmission processing method. Therefore, all embodiments of the foregoing repeat transmission processing method are applicable to the terminal, and a same or similar beneficial effect can be achieved.

An embodiment of this application further provides a network side device, including a processor and a communication interface, where the communication interface is configured to send first information, where the first information is used to indicate at least one transmission gap in a first repeat transmission process; and the processor is configured to perform a second operation corresponding to a first operation in the transmission gap. This network side device embodiment corresponds to the foregoing method embodiment on the network side device. Each implementation process and implementation of the foregoing method embodiment may be applicable to this network side device embodiment, and a same technical effect can be achieved.

Figure 8:
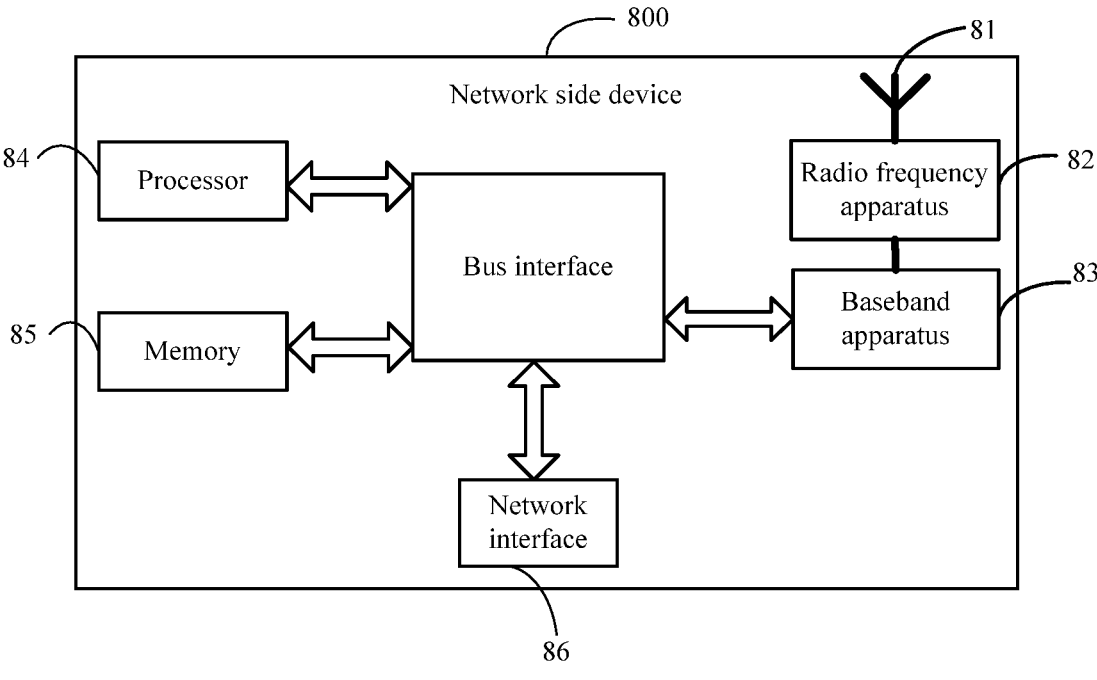
FIG. 8 is a schematic structural diagram of a network side device according to an embodiment of this application.

Optionally, an embodiment of this application further provides a network side device. As shown in FIG. 8, a network side device 800 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81, and sends the received information to the baseband apparatus 83 for processing. In a downlink direction, the baseband apparatus 83 processes to-be-sent information, and sends the information to the radio frequency apparatus 82. The radio frequency apparatus 82 processes the received information and then sends the information by using the antenna 81.

The frequency band processing apparatus may be located in the baseband apparatus 83. The method performed by the network side device in the foregoing embodiment may be implemented in the baseband apparatus 83. The baseband apparatus 83 includes a processor 84 and a memory 85.

The baseband apparatus 83 may include, for example, at least one baseband board, where a plurality of chips are disposed on the baseband board. As shown in FIG. 8, one chip is, for example, the processor 84, which is connected to the memory 85, so as to invoke a program in the memory 85 to perform operations of the network side device shown in the foregoing method embodiment.

The baseband apparatus 83 may further include a network interface 86, configured to exchange information with the radio frequency apparatus 82. For example, the interface is a common public radio interface (CPRI).

Optionally, the network side device in this embodiment of the present invention further includes an instruction or a program that is stored in the memory 85 and executable on the processor 84. The processor 84 invokes the instruction or the program in the memory 85 to perform the method performed by the modules shown in FIG. 8, and a same technical effect is achieved. To avoid repetition, details are not described herein again.

An embodiment of this application further provides a non-transitory readable storage medium. The non-transitory readable storage medium may be non-volatile or volatile. The non-transitory readable storage medium stores a program or an instruction, and the program or the instruction is executed by a processor to implement the processes of the foregoing repeat transmission processing method embodiment, and a same technical effect can be achieved. To avoid repetition, details are not described herein again.

An embodiment of this application further provides a computer program product, where the computer program product is stored in a non-transient storage medium, and the computer program product is executed by at least one processor to implement the steps of the repeat transmission processing method provided in the embodiments of this application, and a same technical effect can be achieved. To avoid repetition, details are not described herein again.

The processor is a processor in the terminal in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing repeat transmission processing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A repeat transmission processing method, comprising:
obtaining, by a terminal, first information;
determining, by the terminal, at least one transmission gap in a first repeat transmission process according to the first information;
performing, by the terminal, a first operation in a transmission gap,
wherein a transmission type of the first operation in the transmission gap comprises timing advance (TA) compensation; and
in a case that the transmission type of the first operation comprises TA compensation, the performing, by the terminal, the first operation in the transmission gap comprises:
calculating, by the terminal, a TA value of a service link according to a positioning capability and an ephemeris;
calculating, by the terminal, a TA value of a feedback link by using a TA change rate; and
performing, by the terminal, TA compensation according to the TA value of the service link and the TA value of the feedback link, wherein a compensated TA value takes effect when the transmission gap ends.

2. The repeat transmission processing method according to claim 1, wherein the obtaining, by a terminal, first information comprises:
obtaining, by the terminal, the first information in a first manner, wherein the first manner comprises at least one of following:
a network preconfiguration;
a radio resource control (RRC) configuration;
a downlink control information (DCI) configuration; or
a medium access control control element (MAC CE) configuration.

3. The repeat transmission processing method according to claim 1, wherein the first information comprises at least one of following:
enabling information of the transmission gap;

time domain offset information of the transmission gap in the first repeat transmission process;
period information of the transmission gap in the first repeat transmission process;
a time domain resource length of the transmission gap in the first repeat transmission process;
a quantity of the transmission gap in the first repeat transmission process;
the transmission type of the first operation in the transmission gap; or
time domain resource information of the first operation in the transmission gap.

4. The repeat transmission processing method according to claim 3, wherein the transmission type of the first operation in the transmission gap further comprises at least one of following:
downlink synchronization;
monitoring a physical downlink control channel (PDCCH);
uplink synchronization;
random access;
cell reselection;
cell switching;
beam switching; or
a feedback of completed repeat transmission.

5. The repeat transmission processing method according to claim 4, wherein in a case that the transmission type of the first operation comprises downlink synchronization, the time domain resource length of the transmission gap is greater than or equal to a time length required for switching between uplink and downlink.

6. The repeat transmission processing method according to claim 4, wherein
in a case that the transmission type of the first operation comprises uplink synchronization or downlink synchronization, the performing, by the terminal, a first operation in the transmission gap comprises:
calculating, by the terminal, a frequency offset value of a service link according to a positioning capability and ephemeris information; and
performing, by the terminal, pre-compensation on a frequency offset from a terminal to a satellite and a frequency offset from the satellite to a base station according to the frequency offset value of the service link and a frequency offset value of a feedback link indicated by a network; or performing, by the terminal, pre-compensation on a frequency offset from a terminal to a satellite according to the frequency offset value of the service link;
or
in a case that the transmission type of the first operation comprises beam switching, the performing, by the terminal, a first operation in the transmission gap comprises:
in response to RRC connection release signaling triggered by a network, entering, by the terminal, an RRC idle state from an RRC connected state, and suspending the first repeat transmission process;
selecting, by the terminal, an optimal beam, executing a random access process, and reporting the optimal beam to the network in the random access process; and
determining, by the terminal, according to an indication of the network, a beam to which the terminal is to be switched, and switching to a beam indicated by the network;
or in a case that the transmission type of the first operation comprises a feedback of completed repeat transmission, the performing, by the terminal, a first operation in the transmission gap comprises:

switching, by the terminal, to a downlink to receive reception feedback information that is of repeat transmission and that is sent by a network; and if the reception feedback information is an acknowledgement feedback, stopping, by the terminal, the first repeat transmission process after the first operation ends; or if the reception feedback information is a negative acknowledgement feedback, continuing, by the terminal, the first repeat transmission process after the first operation ends.

7. The repeat transmission processing method according to claim 4, wherein in a case that the transmission type of the first operation comprises at least one of random access, cell reselection, cell switching, or beam switching, if the terminal has completed random access, stopping, by the terminal, the first repeat transmission process after the first operation ends;

or if the terminal has completed cell reselection, stopping, by the terminal, the first repeat transmission process after the first operation ends.

8. A repeat transmission processing method, comprising:

sending, by a network side device, first information, wherein the first information is used to indicate at least one transmission gap in a first repeat transmission process;

performing, by the network side device, a second operation corresponding to a first operation in a transmission gap, wherein a transmission type of the first operation in the transmission gap comprises timing advance (TA) compensation; and in a case that the transmission type of the first operation comprises TA compensation, the performing, by the network side device, the second operation corresponding to the first operation in the transmission gap comprises:

calculating, by the network side device, a TA value of a feedback link by using a TA change rate or ephemeris information, and feeding back the TA value of the feedback link to a terminal, so that the terminal performs TA compensation according to a TA value of a service link and the TA value of the feedback link, wherein a compensated TA value takes effect when the transmission gap ends.

9. The repeat transmission processing method according to claim 8, wherein the first information comprises at least one of the following:

enabling information of the transmission gap;

time domain offset information of the transmission gap in the first repeat transmission process;

period information of the transmission gap in the first repeat transmission process;

a time domain resource length of the transmission gap in the first repeat transmission process;

a quantity of the transmission gap in the first repeat transmission process;

the transmission type of the first operation in the transmission gap; or time domain resource information of the first operation in the transmission gap.

10. The repeat transmission processing method according to claim 9, wherein the transmission type of the first operation in the transmission gap further comprises at least one of following:

downlink synchronization;

monitoring a physical downlink control channel (PDCCH);

uplink synchronization;

random access;

cell reselection;

cell switching;

beam switching; or a feedback of completed repeat transmission.

11. The repeat transmission processing method according to claim 10, wherein in a case that the transmission type of the first operation comprises uplink synchronization or downlink synchronization, the performing, by the network side device, a second operation corresponding to a first operation in the transmission gap comprises:

calculating, by the network side device, a frequency offset value of a feedback link, and feeding back the frequency offset value of the feedback link to a terminal, so that the terminal performs pre-compensation on a frequency offset from the terminal to a satellite and a frequency offset from the satellite to a base station according to a frequency offset value of a service link and the frequency offset value of the feedback link;

or calculating, by the network side device, a frequency offset value of a feedback link, and performing post-compensation on a frequency offset from a satellite to a base station according to the frequency offset value of the feedback link;

or in a case that the transmission type of the first operation comprises beam switching, the performing, by the network side device, a second operation corresponding to a first operation in the transmission gap comprises:

sending, by the network side device, RRC connection release signaling to a terminal, to instruct the terminal to enter an RRC idle state from an RRC connected state and suspend the first repeat transmission process;

receiving, by the network side device, an optimal beam reported by the terminal in a random access process; and indicating, by the network side device to the terminal according to the optimal beam, a beam to which the terminal is to be switched;

or in a case that the transmission type of the first operation comprises a feedback of completed repeat transmission, the performing, by the network side device, a second operation corresponding to a first operation in the transmission gap comprises:

sending, by the network side device, reception feedback information of repeat transmission to a terminal; and if the reception feedback information is an acknowledgement feedback, stopping, by the network side device, the first repeat transmission process after the first operation ends; or if the reception feedback information is a negative acknowledgement feedback, continuing, by the network side device, the first repeat transmission process after the first operation ends.

12. A terminal, comprising a processor, a memory, and a program or an instruction that is stored in the memory and executable on the processor, wherein the program or the instruction, when executed by the processor, causes the terminal to perform:

obtaining first information;

determining at least one transmission gap in a first repeat transmission process according to the first information;

performing a first operation in a transmission gap, wherein a transmission type of the first operation in the transmission gap comprises timing advance (TA) compensation; and in a case that the transmission type of the first operation comprises TA compensation, the program or the instruction, when executed by the processor, causes the terminal to perform:

calculating a TA value of a service link according to a positioning capability and an ephemeris:

calculating a TA value of a feedback link by using a TA change rate; and performing TA compensation according to the TA value of the service link and the TA value of the feedback link, wherein a compensated TA value takes effect when the transmission gap ends.

13. The terminal according to claim 12, wherein the first information comprises at least one of following:

enabling information of the transmission gap;

time domain offset information of the transmission gap in the first repeat transmission process;

period information of the transmission gap in the first repeat transmission process;

a time domain resource length of the transmission gap in the first repeat transmission process;

a quantity of the transmission gap in the first repeat transmission process;

the transmission type of the first operation in the transmission gap; or time domain resource information of the first operation in the transmission gap.

14. The terminal according to claim 13, wherein the transmission type of the first operation in the transmission gap further comprises at least one of following:

downlink synchronization;

monitoring a physical downlink control channel (PDCCH);

uplink synchronization;

random access;

cell reselection;

cell switching;

beam switching; or a feedback of completed repeat transmission.

15. The terminal according to claim 14, wherein in a case that the transmission type of the first operation comprises uplink synchronization or downlink synchronization, the program or the instruction, when executed by the processor, causes the terminal to perform:

calculating a frequency offset value of a service link according to a positioning capability and ephemeris information; and performing pre-compensation on a frequency offset from a terminal to a satellite and a frequency offset from the satellite to a base station according to the frequency offset value of the service link and a frequency offset value of a feedback link indicated by a network; or performing pre-compensation on a frequency offset from a terminal to a satellite according to the frequency offset value of the service link;

or in a case that the transmission type of the first operation comprises beam switching, the program or the instruction, when executed by the processor, causes the terminal to perform:

in response to RRC connection release signaling triggered by a network, entering an RRC idle state from an RRC connected state, and suspending the first repeat transmission process;

selecting an optimal beam, executing a random access process, and reporting the optimal beam to the network in the random access process; and determining according to an indication of the network, a beam to which the terminal is to be switched, and switching to a beam indicated by the network;

or in a case that the transmission type of the first operation comprises a feedback of completed repeat transmission, the program or the instruction, when executed by the processor, causes the terminal to perform:

switching to a downlink to receive reception feedback information that is of repeat transmission and that is sent by a network; and if the reception feedback information is an acknowledgement feedback, stopping the first repeat transmission process after the first operation ends; or if the reception feedback information is a negative acknowledgement feedback, continuing the first repeat transmission process after the first operation ends.

16. A network side device, comprising a processor, a memory, and a program or an instruction that is stored in the memory and executable on the processor, wherein the program or the instruction, when executed by the processor, causes the network side device to perform step of the repeat transmission processing method according claim 8.

17. A network side device, comprising a processor, a memory, and a program or an instruction that is stored in the memory and executable on the processor, wherein the program or the instruction, when executed by the processor, causes the network side device to perform step of the repeat transmission processing method according claim 9.

18. A network side device, comprising a processor, a memory, and a program or an instruction that is stored in the memory and executable on the processor, wherein the program or the instruction, when executed by the processor, causes the network side device to perform step of the repeat transmission processing method according claim 10.

19. A network side device, comprising a processor, a memory, and a program or an instruction that is stored in the memory and executable on the processor, wherein the program or the instruction, when executed by the processor, causes the network side device to perform step of the repeat transmission processing method according claim 11.

20. The terminal according to claim 12, wherein the program or the instruction, when executed by the processor, further causes the terminal to perform:

obtaining the first information in a first manner, wherein the first manner comprises at least one of following:

a network preconfiguration;

a radio resource control (RRC) configuration;

a downlink control information (DCI) configuration; or a medium access control control element (MAC CE) configuration.

* * * * *